(12) United States Patent
Yuan

(10) Patent No.: US 8,054,379 B2
(45) Date of Patent: Nov. 8, 2011

(54) PORTABLE ELECTRONIC DEVICE

(75) Inventor: Kun-I Yuan, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 661 days.

(21) Appl. No.: 12/138,265

(22) Filed: Jun. 12, 2008

(65) Prior Publication Data

US 2009/0161004 A1  Jun. 25, 2009

(30) Foreign Application Priority Data

Dec. 19, 2007  (CN) .......................... 2007 1 0203214

(51) Int. Cl.
*H04N 5/225* (2006.01)
*H04M 1/00* (2006.01)

(52) U.S. Cl. ...... 348/376; 348/369; 348/375; 455/556.1

(58) Field of Classification Search .................. 348/373, 348/375, 376, 369, 552, 340, 344
See application file for complete search history.

(56) References Cited

U.S. PATENT DOCUMENTS

| 6,532,035 B1 * | 3/2003 | Saari et al. ................. 348/14.02 |
| 6,898,301 B2 * | 5/2005 | Iwanaga ........................ 382/124 |
| 6,992,699 B1 * | 1/2006 | Vance et al. ............. 348/207.99 |
| 2002/0044216 A1 * | 4/2002 | Cha ................................ 348/376 |
| 2002/0061767 A1 * | 5/2002 | Sladen et al. ................ 455/556 |
| 2003/0095200 A1 * | 5/2003 | Nagano ........................ 348/373 |
| 2003/0181225 A1 * | 9/2003 | Hasegawa et al. ............ 455/566 |
| 2005/0041148 A1 * | 2/2005 | Bae ................................ 348/552 |
| 2005/0054377 A1 * | 3/2005 | Yeh ............................ 455/556.1 |

FOREIGN PATENT DOCUMENTS

CN       1949020 A       4/2007

* cited by examiner

*Primary Examiner* — David Ometz
*Assistant Examiner* — Carramah J Quiett
(74) *Attorney, Agent, or Firm* — Altis Law Group, Inc.

(57) ABSTRACT

A portable electronic device includes a housing including an opening defined in a peripheral side surface thereof, a camera module mounted in the housing, and a light-reflecting member rotatably mounted at the opening. The camera module is aligned with and faces toward the opening. The light-reflecting member mounted at the opening and is configured for reflecting light into the camera module. The portable electronic device is capable of employing high resolution camera module while retaining thin thickness.

6 Claims, 3 Drawing Sheets

PORTABLE ELECTRONIC DEVICE

BACKGROUND

1. Technical Field

The present invention generally relates to a portable electronic device, more specifically, relates to a portable electronic device including a camera module.

2. Discussion of Related Art

Camera modules are widely employed in various portable electronic devices such as mobile phones, smart phones, and personal digital assistants. Take mobile phones as an example, a camera module is generally installed on a rear cover of a mobile phone and an optical axis of the lens in the camera module is perpendicular to the rear side. A view captured by the camera module can be easily viewed from a screen installed on a front cover of the mobile phone.

With progress of technology, resolution and functions of camera modules have improved. In order to meet the increasing requirements of camera modules, more and more lenses are employed in a single camera module, which results in increasing dimensions of the camera module, which unfortunately means it is becoming more difficult to further miniaturize mobile phones using such camera modules.

Therefore, there is a desire to provide a thin portable electronic device including a high resolution camera module.

SUMMARY

In one exemplary embodiment, a portable electronic device includes a housing including an opening defined in a peripheral side surface thereof, a camera module mounted in the housing, and a light-reflecting member rotatably mounted at the opening. The camera module is aligned with and faces toward the opening. The light-reflecting member mounted at the opening and is configured for reflecting light into the camera module.

This and other features and advantages of the present invention as well as the preferred embodiments thereof and a cleaning apparatus in accordance with the invention will become apparent from the following detailed description and the descriptions of the drawings.

BRIEF DESCRIPTION OF THE DRAWINGS

Many aspects of the present invention can be better understood with reference to the following drawings. The components in the drawings are not necessarily drawn to scale, the emphasis instead being placed upon clearly illustrating the principles of the present invention.

DETAILED DESCRIPTION OF EXEMPLARY EMBODIMENTS

Figure 1:
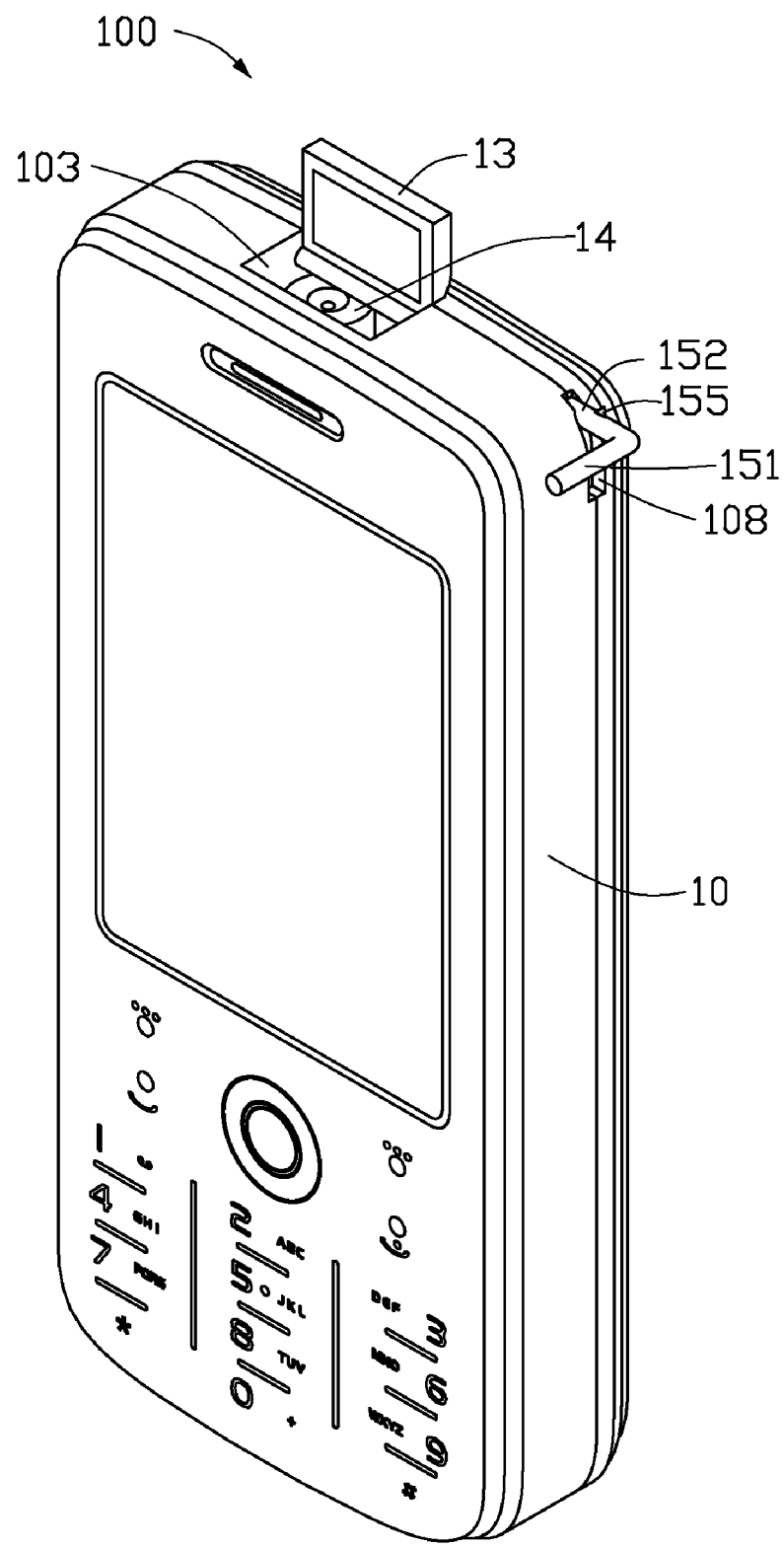
FIG. 1 illustrates a portable electronic device in accordance with an embodiment.

FIG. 1 illustrates a portable electronic device 100 in accordance with a first embodiment that includes a housing 10, a light-reflecting member 13, a camera module 14, and a driving member 15. An opening 103 is formed in a peripheral side surface of the housing 10. The camera module 14 is mounted in the housing 10 opposite to the opening 103. The light reflecting member 13 is rotatably disposed adjacent to an edge of the opening 103. The driving member 15 is rotatably received in a receiving hole defined in a sidewall of the housing 10. The driving member 15 is non-rotatably engaged with the light reflecting member 13 such that the light reflecting member 13 can be rotated by driving the driving member 15.

Figure 2:
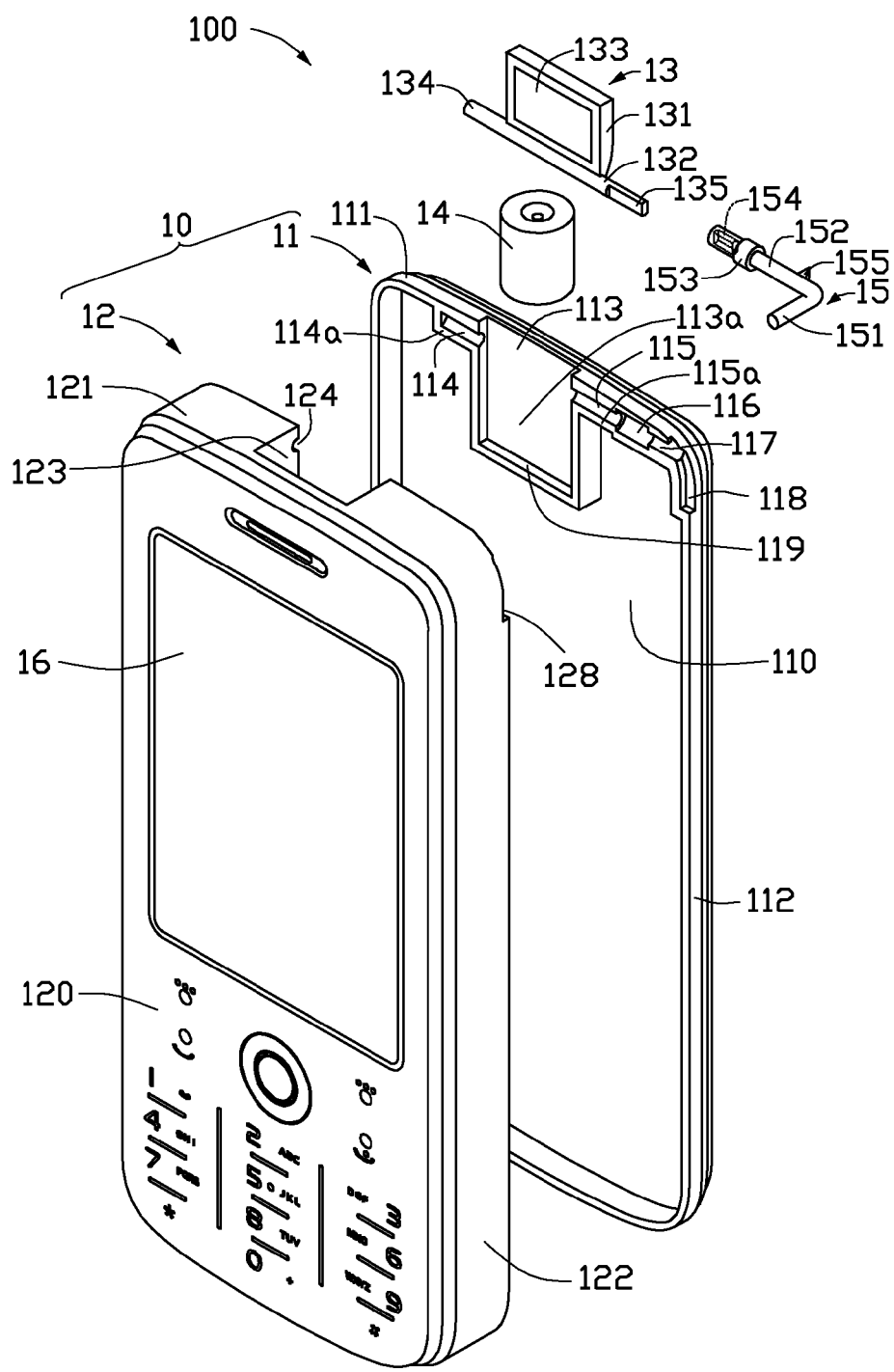
FIG. 2 is an exploded view of FIG. 1.

Referring to FIG. 2, the housing 10 includes a first housing member 11 and a second housing member 1 2. The first housing member 11 includes a rectangular shaped bottom plate 110. Four adjoining sidewalls extend from four sides of the rectangular shaped bottom plate 110 respectively. Each sidewall is perpendicular to the bottom plate 110. The four sidewalls include a first sidewall 111 and a second sidewall 112 adjacent to the first sidewall 111. A cutout 113 is formed in the first sidewall 111. A slit 118 is formed in the second sidewall 112. The slit 118 is adjacent to the first sidewall 111.

A first protrusion 114a, a second protrusion 115a, and a protruding wall 119 extend from the bottom plate 110. The first protrusion 114a and the second protrusion 115a are arranged at two ends of the cutout 113. Each of the first protrusion 114a and the second protrusion 115a adjoins the first sidewall 111. The protruding wall 119 defines a receiving space 113a adjoining the cutout 113.

A first groove 114 is formed in the first protrusion 114a. A second groove 115, a securing groove 116, and a third groove 117 are sequentially formed in the second protrusion 115a. The second groove 115 is adjacent to the cutout 113, and the third groove 117 is in communication with the slit 118. Cross sections of the first groove 114, the second groove 115, the securing groove 116, and the third groove 117 are arc shaped, preferably, semicircular shaped. The cross section area of the securing groove 116 is larger that that of the third groove 117.

The second housing member 12 includes a substantially rectangular shaped front panel 120, a first sidewall 121 and a second sidewall 122 adjoining to the first side wall 121. A cutout 123 is formed in the first sidewall 121. A second slit 128 is formed at an end of the second sidewall 122. The second slit 128 is adjacent to the first sidewall 121. When the first housing member 11 and the second housing member 12 are assemble together, as shown in FIG. 1, the first cutout 113 and the second cutout 123 cooperatively define an opening 103 in the housing 10, and the first slit 118, the second slit 128 cooperative define an receiving slit 108 in the housing 10.

The light reflecting member 13 includes a cover 131, a rotary shaft 132, and a light reflecting mirror 133 attached to the cover 131. The rotary shaft 132 is fixed to a side of the cover 131. The rotary shaft 132 includes a first end 134 and a second end 135. The second end 135 is non-circular in cross section (polygon shaped for example).

The driving member 15 includes a handle 151, driving shaft 152, and a ring shaped protrusion 153. The handle 151 extends from a first end of the driving shaft 152. Preferably, the handle 151 is perpendicular to the driving shaft 152. A skidproof structure 155 is formed on the first end of the driving shaft 152. In this embodiment, the skidproof structure 155 includes a small protrusion. A receiving hole 154 is formed at a second end of the driving shaft 152. The receiving hole 154 extends along an axis direction of the driving shaft 152. The receiving hole 154 is structured to mate with the second end 135 of the rotary shaft 132.

When the light reflecting member 13 is assembled with the housing 10, the first end 134 and the second end 135 of the rotary shaft 132 are received in the first groove 114 and the second groove 115 respectively, the light reflecting member 13 is thereby rotatably mounted in the housing 10. The driving shaft 152 is received in the second groove 115, the securing groove 116 and the third groove 117 and the ring shaped protrusion 153 is received the securing groove 116. Furthermore, a length of the securing groove 116 is larger than a length of the ring shaped protrusion 153; therefore, the driving shaft 152 is rotatably and telescopically disposed in the housing 10. The second end 135 of the rotary shaft is received in the receiving hole 154 of the driving shaft 152; as a result, the light reflecting member 13 can be rotated by driving the driving member 15. When the first housing member 11 and the second housing member 12 are assembled together, the light reflecting member 13 and the driving member 15 are secured between the first housing member 11 and the second housing member 12.

It is understood that similar structure of the first housing member 11 can be formed in the second housing member 12, specifically, a mirror copy of the first protrusion 114a, the second protrusion 115a, the protruding wall 119, the first groove 114, the second groove 115, the securing groove 116, and the third groove 117 can be formed in the second housing member 12. In other words, the second housing member 12 includes a first protrusion 124a, a second protrusion, a protruding wall, a first groove 124, a second groove, a securing groove, and a third groove. When the first housing member 11 and the second housing member 12 are assembled together, the first groove 114 and the second groove 124 are combined together thereby defining a first shaft hole. Similarly, the second groove 115 and the second groove in the second housing member constitute a second shaft hole, the securing groove 116 in the first housing member and the securing groove in the second housing member constitute a securing hole, the third groove 117 and the third groove in the second housing member 12 constitute a third through hole, the receiving space 113a and the receiving space in the second housing member 12 constitute a receiving chamber. The first end 134 and the second end 135 of the rotary shaft 132 can be received in the first shaft hole and the second shaft hole respectively. The camera module 14 can be received in the receiving chamber. The driving shaft 152 of the driving member 15 passes through the third through hole, the securing hole, and then finally enters the second shaft hole.

To use of the camera module 14, draw the driving member 15 out a little and then rotate the driving shaft 152 using the handle 151, the rotary shaft 132 and the cover 131 rotate with the driving shaft 152 and the camera module is exposed through the opening 103; adjust an angle of the cover 131 such that a view you want to record is reflected into the camera module 14. The view captured by the camera module 14 can be viewed on the screen 16. For example, when the cover 131 is at an angle of 45 degrees, a user can take an image of himself while viewing the image on the screen 16. It is understood that when the cover 131 is in at angle of 90 degrees, the cover 131 is fully opened and light can directly enter the camera module.

Figure 3:
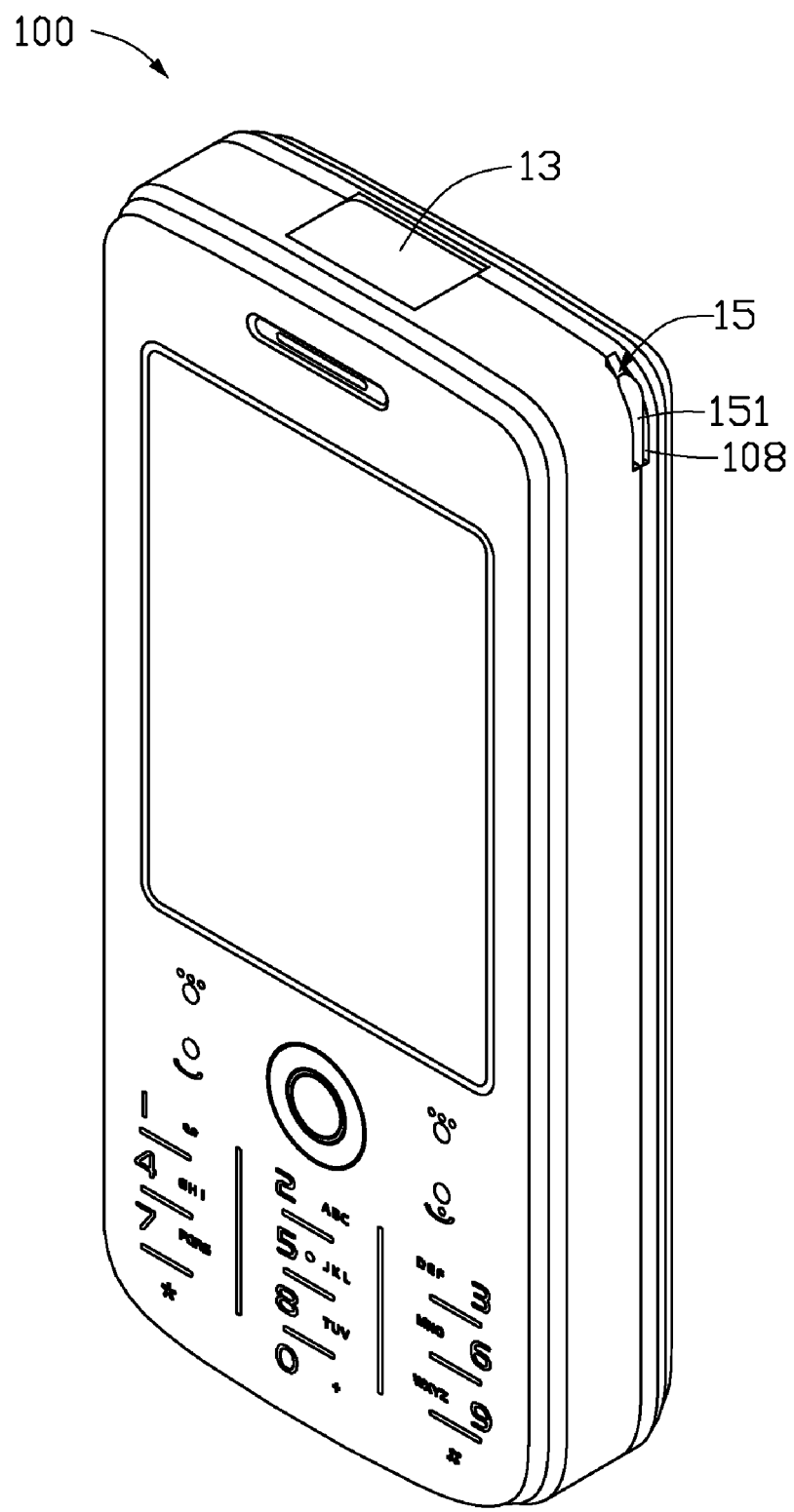
FIG. 3 is a schematic view showing a usage state of the portable electronic device of FIG. 1.

Referring to FIG. 3, when the light reflecting member 13 is closed, the driving member 15 can be pushed inwardly such that the handle 151 of the driving member 15 is received in the receiving slit 108, as a result, the driving member 15 can't rotate freely, consequently, the light reflecting member 13 is locked. In other words, the driving member 15 also serves as a latching mechanism of the light reflecting member 13.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A portable electronic device, comprising:
a housing comprising an opening defined in a peripheral side surface of the housing;
a camera module mounted in the housing, wherein the camera module is aligned with and faces toward the opening;
a light-reflecting member rotatably mounted at the opening, wherein the light-reflecting member is selectively configured for reflecting outside light into the camera module or closing the opening; and
a driving member, wherein the driving member comprises a driving shaft rotatably disposed in the housing, the driving shaft is engaged with the light reflecting member, the driving member further comprises a handle extending from an end of the driving shaft, and a slit is defined in the housing for receiving the handle,
wherein the light-reflecting member comprises a rotary shaft rotatably mounted in the housing, the driving shaft coupled to the rotary shaft,
wherein the housing comprises a first housing member and a second housing member, the rotary shaft is rotatably secured between the first housing member and the second housing member, and
wherein the first housing member comprises a bottom plate, a first protrusion, and a second protrusion extending from the bottom plate, a first groove and a second groove formed in the first protrusion and the second protrusion respectively, two ends of the rotary shaft received in the first groove and the second groove respectively, a securing groove and a third groove is formed in the second protrusion, the securing groove in communication with the second groove and the third groove, the driving shaft received in the second groove, the securing groove, and the third groove.

2. The portable electronic device as claimed in claim 1, wherein the housing includes a receiving space receiving the camera module.

3. The portable electronic device as claimed in claim 1, wherein a cross section of a distal end of the rotary shaft is polygon shaped.

4. The portable electronic device as claimed in claim 1, wherein the driving member comprises a skidproof structure formed on the driving shaft.

5. The portable electronic device as claimed in claim 1, wherein the skidproof structure comprises protrusions formed on the driving shaft.

6. The portable electronic device as claimed in claim 1, wherein the light-reflecting member further comprises a cover for closing the opening and a light reflecting mirror fixed on the cover, the rotary shaft is fixed to the cover.

* * * * *